United States Patent [19]

Bradley et al.

[11] Patent Number: 4,473,406

[45] Date of Patent: Sep. 25, 1984

[54] CEMENTIFEROUS COMPOSITIONS

[75] Inventors: Geoffrey Bradley, Burtonwood, England; Chester D. Szymanski, Martinsville, N.J.

[73] Assignee: National Starch and Chemical Corporation, Bridgewater, N.J.

[21] Appl. No.: 500,598

[22] Filed: Jun. 8, 1983

Related U.S. Application Data

[63] Continuation-in-part of Ser. No. 390,167, Jun. 21, 1982, abandoned.

[51] Int. Cl.$^3$ .............................................. C04B 7/35
[52] U.S. Cl. .................................... 106/90; 106/314
[58] Field of Search ................................ 106/90, 314

[56] References Cited

U.S. PATENT DOCUMENTS

| | | | |
|---|---|---|---|
| 3,806,571 | 4/1974 | Ronnmark et al. | 264/82 |
| 3,850,651 | 11/1974 | Duncan et al. | 106/90 |
| 4,229,224 | 10/1980 | Dawson et al. | 106/90 |

FOREIGN PATENT DOCUMENTS

| | | | |
|---|---|---|---|
| 275397 | 10/1969 | Austria | 106/90 |
| 485614 | 3/1970 | Switzerland | 106/90 |
| 1388350 | 3/1975 | United Kingdom | 106/90 |
| 2018737 | 10/1979 | United Kingdom | 106/90 |

OTHER PUBLICATIONS

M. Gierloff, "Plastic Dispersions Based on Polyacrylic Acid Esters as Concrete Additives", Amts-Mitteilungsbl. Bundesanst. Materialpruef Berlin, 1979, 9, (1), 2–7, (Ger), C.A., 91:127973d.

*Primary Examiner*—James Poer
*Attorney, Agent, or Firm*—Edwin Szala; Margaret B. Kelley

[57] ABSTRACT

This invention provides cementiferous compositions having improved flow characterisitics which are given by the incorporation of certain hydroxy acrylate copolymers. Typical copolymers are of acrylic or methacrylic acid with a hydroxyalkyl acrylate or methacrylate and are used preferably in the range 0.01% to 2.5% w/w on the cement in the cementiferous composition. This invention also provides novel additive compositions for use in the cementiferous compositions.

20 Claims, No Drawings

CEMENTIFEROUS COMPOSITIONS

This application is a continuation-in-part of our copending application Ser. No. 390,167, filed June 21, 1982, now abandoned.

BACKGROUND OF THE INVENTION

This invention relates to cementiferous compositions and to additives for use in such compositions, which improve the physical characteristics such as the flow and workability of such compositions.

The cementiferous compositions with which this invention is concerned include concretes which comprise cement, coarse and fine aggregates and water; cement pastes which comprise cement and water, and mortars which comprise cement, sand and water; lime, sand and water, or mixtures containing both lime and cement. The invention is also applicable to high-pressure, steam-cured concretes comprising cement, aggregate and water; lime or limestone and siliceous materials such as silica flour and water.

The additives with which this invention is concerned are sometimes referred to as placticisers for concrete. Their purpose is to improve the flow characteristics of the cementiferous compositions containing them so that they may be pumped or effectively poured to fill all the spaces in a mould or other structure and yet not have their strength characteristics weakened by the inclusion of excessive amounts of air which, in certain circumstances, would be undesirable. In addition, these additives can be used to design cementiferous compositions with a reduced water content which still retain adequate flow properties for certain purposes and also produce a stronger concrete.

Various additives for use in cementiferous compositions have been previously proposed, including for example, lignosulphonates and sodium naphthalene sulfphonate formaldehyde condensates. Details of such materials are set out in "Chemical Admixtures for Concrete" by M. R. Rixom, published by E. and F. N. Spon Limited, London, and by the Halstead Press, a division of John Wiley and Sons Incorporated of New York, USA, where, at page 34, various known additives are considered.

Various polymeric materials have been evaluated as plasticiser additives for cementiferous compositions and it has now been found that certain water-soluble copolymers and their soluble salts comprising copolymers of ethylenically polymerizable carboxylic acids and the hydroxy alkyl esters of such acids have particular merit in this application.

SUMMARY OF THE INVENTION

This invention provides a cementiferous composition comprising, as a plasticizer additive, a copolymer, water-soluble or soluble salt thereof, comprising from 50 to 95 mole % of an ethylenically polymerizable carboxylic acid and from 5 to 50 mole % of a hydroxy alkyl ester of an ethylenically polymerizable carboxylic acid. The additives may conveniently contain an anti-foaming agent, alternatively known as an air detraining agent.

In accordance with a further aspect of this invention, there is provided a plasticiser additive composition comprising an aqueous solution of a copolymer or soluble salt thereof, comprising from 50 to 95 mole % of an ethylenically polymerizable carboxylic acid and from 5 to 50 mole % of a hydroxy alkyl ester of an ethylenically polymerizable caboxylic acid and an effective amount of an anti-foaming agent. Suitable and preferred acids and esters are discussed hereinbelow.

DESCRIPTION OF THE PREFERRED EMBODIMENTS

Suitable acids include acrylic, methacrylic, crotonic, maleic, fumaric, itaconic, citraconic, and/or aconitic acids and like ethylenically unsaturated acids. The preferred acids are acrylic, methacrylic, and maleic acid, with acrylic or methacrylic acid being most preferred. Suitable esters include the hydroxy ethyl, propyl, butyl, and like esters of the above acids. The preferred are those having hydroxy alkyl substituents of $C_1$-$C_8$, most preferably hydroxy propyl. Preferred copolymers include copolymers of acrylic acid and hydroxy ethyl acrylate or methacrylate and of acrylic or methacrylic acid and hydroxypropyl acrylate or methacrylate. The most preferred copolymer is that of acrylic acid and hydroxy propyl methacrylate.

Preferably, the amount of anit-foaming agent in the composition is in the range 0.1% to 2.0% by weight of the copolymer or salt thereof. Suitable agents include tributyl phosphate, dibutyl phthalate, various water-insoluble alcohols and silicone derivatives.

Preferably the mole percentage of the acid in the copolymer is in the range 60 to 85 mole %. Absolute molecular weight of the copolymers of this invention have not been determined. However, apparent molecular weights as calculated relative to polyethylene glycol standards have been determined, using gel permeation chromatography. The apparent molecular weight of the copolymer may be varied over a wide range, the preferred range being 1000 to 15,000, most preferably 1000 to 9000.

Precise molecular weights have not been determined for all the copolymers used but in some cases viscosity determinations have been carried out. The preferred viscosity is less than 30 cps. as a 15% by weight aqueous solution in 1 molar NaCl.

The amount of hydroxy alkyl acrylate copolymer or soluble salt thereof used is preferably in the range of 0.01 to 2.5%, preferably 0.03 to 2.0%, on the cement in the cementiferous composition.

Suitable copolymers may be made by the copolymerization of the hydroxyl alkyl acrylate or methacrylate with the acrylic acid or other appropriate comonomers, using methods known in polymerization technology. The resultant copolymer may be neutralized with a suitable base such as sodium hydroxide or other soluble base and diluted with water to the required concentration for use in the cementiferous compositions and plasticiser additives provided by this invention.

EXAMPLES

Materials and Methods (a) Mix Design

| Ordinary Portland Cement ex Blue Circle | 350 kg/m$^3$ |
|---|---|
| ₋₀ mm Croxden Gravel | 780 kg/m$^3$ |
| 10 mm Croxden Gravel Zone 3 | 330 kg/m$^3$ |
| Almington Pit Sand % Fines = 40 Aggregate/cement = 5.3 | 740 kg/m$^3$ |

Aggregates were washed, dried for 24 hours on a steam bed and allowed to cool for a further 24 hours.

(b) Mixing Procedure

The aggregate is placed in the mixer, approximately half the mixing water added and mixed for 30 seconds. After standing for 1 minute the mixer is re-started and the cement added over 30 seconds. The remaining water (containing the additive) is added and mixed for a further 3 minutes.

(c) Slump Test, Plastic Density, Compressive Strength To British Standard BS 1881.

Results

Three copolymers additives (A, B and C) of the invention were prepared as described above and compared with known additives (D and E).

|  |  |  | Mw | Mn | Visc (cps) 15% solids 1 m NaCl |
|---|---|---|---|---|---|
| (i) | 75 mole % acrylic acid | Admixture A | 8800 | 4300 | 5.5 |
|  | 25 mole % hydroxy propyl acrylate |  |  |  |  |
| (ii) | 67 mole % acrylic acid | Admixture B | 8500 | 4700 | 5.3 |
|  | 33 mole % hydroxy propyl acrylate |  |  |  |  |
| (iii) | 80 mole % acrylic acid | Admixture C | 9000 | 4500 | 5.7 |
|  | 20 mole % hydroxy propyl acrylate |  |  |  |  |
| (iv) | Calcium ligno sulphonate 42% solution | Admixture D |  |  |  |
| (v) | Polymerized Sodium naphthalene sulphonate 30% solution | Admixture E |  |  |  |

Admixtures A, B and C contained 0.25% by weight of composition of tributyl phosphate (TBP).

These materials were evaluated as plasticisers in concrete using a water/cement (W/C) ratio=0.60.

Admixture dosage used as 140 cm$^3$/50 kg cement as 40% active solutions of their sodium salts.

Results are summarized in Table I.

TABLE I

| Admixture | Plastic Density (kg/m$^3$) | Slump (mm) | Compressive Strength (N/mm$^2$) | |
|---|---|---|---|---|
|  |  |  | 1 day | 7 day |
| Nil | 2330 | 30 | 10.0 | 37.8 |
| D | 2330 | 70 | 9.4 | 37.5 |
| A | 2330 | 160 | 8.8 | 37.0 |
| B | 2330 | 120 | 8.3 | 37.5 |
| C | 2310 | 160 | 7.5 | — |

These results show that the copolymer additives of this invention are more efficient plasticisers than D, admixture A being more efficient than B and equivalent to C.

All the admixtures show some retardation on 1 day compressive strength. Admixture A gave slightly more retardation than D, with C showing significantly more retardation than A at 1 day. All 7 day compressive strength results were similar.

A similar set of experiments were carried out at two different W/C ratios, i.e. 0.64 and 0.56.

Results are shown in Tables II and III respectively.

TABLE II

| Admixture | Dose cm$^3$/50 kg Cement | W/C | Plastic Density (kg/m$^3$) | Slump (mm) | Compressive Strength (N/mm$^2$) | |
|---|---|---|---|---|---|---|
|  |  |  |  |  | 1 day | 7 day |
| Nil | Nil | 0.64 | 2315 | 55 | 9.0 | 34.5 |
| D | 140 | 0.64 | 2315 | 170 | 7.1 | 32.8 |
| A | 140 | 0.64 | 2315 | 210 | 6.8 | 33.5 |

TABLE III

| Admixture | Dose cm$^3$/50 kg Cement | W/C | Plastic Density kg/m$^3$) | Slump (mm) | Compressive Strength (N/mm$^2$) | |
|---|---|---|---|---|---|---|
|  |  |  |  |  | 1 day | 7 day |
| Nil | — | 0.64 | 2330 | 55 | 9.0 | 34.5 |
| D | 140 | 0.56 | — | 10 | — | — |
| A | 140 | 0.56 | 2350 | 60 | 12.4 | 43.3 |
| E | 500 | 0.56 | 2350 | 80 | — | 42.7 |

It can be seen that D is ineffective at a W/C of 0.56 whereas admixture A still gives a slump similar to the control with a water reduction of 12.5%. E required dosage of 500 cm$^3$/50 kg cement to give a similar water reduction.

Compressive strengths are significantly higher than control at 1 and 7 days.

Further work was done to determine the effect of changes in the molecular weight and molar ratio of the components of the copolymer. Details of the copolymer are set out in Table IV and the effects on concrete are shown in Table V.

TABLE IV

| Acrylic Acid (Na salt)-Hydroxy Propyl Acrylate Copolymers | | | | | | |
|---|---|---|---|---|---|---|
| Copolymer (moles) | | Sample | Solids | pH | Visc (cps) 25% in water | 15% Copolymer in 1M NaCl (cps) |
| AA | HPA | No | w/w |  |  |  |
| 3 | 1 | (361/11) | 40.0 | 7.5 | 37 | 5.0 |
|  |  | (361/8) | 41.0 | 7.5 | 42 | 5.9 |
|  |  | (361/12) | 40.0 | 7.5 | 50 | 6.6 |
| 2.5 | 1 | (361/16) | 46.8 | 7.1 | 38 | 5.1 |
|  |  | (361/15) | 45.5 | 7.3 | 43 | 5.4 |
|  |  | (361/25) | 44.3 | 7.5 | 55 | 6.9 |
| 2 | 1 | (361/18) | 44.4 | 7.4 | 38 | 5.9 |
|  |  | (361/19) | 42.6 | 7.6 | 42 | 6.8 |
|  |  | (361/26) | 38.0 | 7.6 | 58 | 7.7 |

AA = Acrylic acid
HPA = Hydroxy propyl acrylate.

These copolymers were evaluated in a 350 kg/m$^3$ OPC concrete mix design.

| Mix Design | |
|---|---|
| OPC ex Blue Circle | 350 kg/m$^3$ |
| 20 mm Croxden Gravel | 780 kg/m$^3$ |
| 10 mm Croxden Gravel | 330 kg/m$^3$ |
| Zone 3 Almington Pit Sand | 740 kg/m$^3$ |
| % Fines = 40 | |
| Aggregate/cement = 5.3 | |

The copolymers were dosed at 0.28% bwc as 30% aqeuous solutions (+0.25% by weight of the composition tributyl phosphate as air entraining suppressant) and the results are detailed below:

TABLE V

| Sample No. | Mole % AA | Molecular Weight as function of viscosity | Slump (mm) | Compressive Strength (N/mm$^2$) 1 day | 7 day | 28 day |
|---|---|---|---|---|---|---|
| 361/11 | 75 | ↓ Increasing | 110 | 8.6 | 31.4 | 39.6 |
| 361/8 | 75 | ↓ Increasing | 104 90 | 8.8 | 31.4 | 40.4 |
| 361/12 | 75 | ↓ | 80 | 8.3 | 30.9 | 40.8 |
| 361/16 | 71.4 | ↓ Increasing | 110 | 8.5 | 31.9 | 41.3 |
| 361/15 | 71.4 | ↓ Increasing | 95 | 8.8 | 31.7 | 38.6 |
| 361/25 | 71.4 | ↓ | 90 | 8.6 | 31.5 | 39.0 |
| 361/18 | 67 | ↓ Increasing | 105 | 8.4 | 30.6 | 38.0 |
| 361/19 | 67 | ↓ Increasing | 105 | 8.1 | 31.2 | 37.0 |
| 361/26 | 67 | ↓ | 95 | 7.4 | 29.5 | 37.8 |
| Nil | Nil | — | 20 | 9.8 | 30.4 | 40.0 |

AA = Acrylic acid.

These results suggest that all the copolymers show some retardation of 1 day compressive strength, being most significant with the 67 mole % AA (2/1) polymers. 7 and 28 days compressive strengths are very similar to control concrete except perhaps with the 67 mole % AA polymers which are somewhat lower. Plasticising action is shown to be related to the molecular weight/viscosity of the polymers and tends to increase as molecular weight/viscosity decreases.

The super-plasticising properties of the additives provided by this invention were compared with admixture E.

The additive of the invention was a 2.5/1 AA/HPA copolymer and comprised:
75 parts of a 40% solids copolymer solution
25 parts of water, and
0.25 parts tributyl phosphate (TBP)
All parts by weight and referred to as EP 82/27.

Super-plasticising Properties

Flowing Concrete

Super-plasticised concrete mixes were produced using composition A and EP 82/27 at a range of dosage levels. Workability was measured using the flow table method (DIN 1048). Flow "A" refers to the spread before tamping and flow "B" to the spread after the prescribed number of tamps.

| Mix Design | |
|---|---|
| OPC ex Blue Circle | 350 kg/m$^3$ |
| 20 mm Croxden Gravel | 780 kg/m$^3$ |
| 10 mm Croxden Gravel | 330 kg/m$^3$ |
| Zone 3 Almington Sand | 740 kg/m$^3$ |
| % Fines = 40 | |
| Aggregate/cement = 5.3 | |
| Water/cement = 0.66 | |

Results are shown in Table VI.

TABLE VI

| Admixture | Admixture Dose % by wt. OPC | Slump (mm) | Flow "A" (cm) | Flow "B" (cm) | Compressive Strength (N/mm$^2$) 1 day | 7 day | 28 day |
|---|---|---|---|---|---|---|---|
| Nil | — | 50 | 20 | — | 9.4 | 31.3 | 38.0 |
| Admix E | 0.3 | — | 21,23 | 47,47 | 8.1 | 29.7 | 38.5 |
| Admix E | 0.5 | — | 25,25 | 51,51 | 9.5 | 32.0 | 39.5 |
| Admix E | 0.74 | — | 26,27 | 55,56 | 8.3 | 32.0 | 39.0 |
| Admix E | 1.0 | — | 40,40 | 63,61 | 9.5 | 32.0 | 37.3 |
| EP 82/27 | 0.1 | — | 22,22 | 50,50 | 8.6 | 31.3 | 38.0 |
| EP 82/27 | 0.2 | — | 26,26 | 53,52 | 9.8 | 32.0 | 38.5 |
| EP 82/27 | 0.3 | — | 27,28 | 56,55 | 7.7 | 31.5 | 37.5 |
| EP 82/27 | 0.4 | — | 35,33 | 62,58 | 7.4 | 31.5 | 37.0 |

EP 82/27 is shown to produce highly workable concrete at much lower dosages than admixture E. The flow properties obtained by using admixture E at typical super-plasticiser dosage rates (0.6–1%) can be achieved by EP 82/27 at rates of addition in the range 0.2–0.4%.

High Range Water Reduction

Admixture E and EP 82/27 were used to produce high range water reductions (constant workability) in the following mix design.

| | |
|---|---|
| OPC ex Blue Circle | 350 kg/m$^3$ |
| 20 mm Croxden Gravel | 780 kg/m$^3$ |
| 10 mm Croxden Gravel | 330 kg/m$^3$ |
| Zone 3 Almington Pit Sand | 740 kg/m$^3$ |
| % Fines = 40 | |
| Aggregate/cement = 5.3 | |

Results shown in Table VII.

TABLE VII

| Admixture | Admixture Dose % by wt OPC | W/C | Slump (mm) | % Water Reduction | Compressive Strength (N/mm$^2$) 1 day | 7 day | 28 day |
|---|---|---|---|---|---|---|---|
| Nil | — | 0.66 | 60 | — | 8.2 | 27.3 | 38.5 |
| Admix E | 0.3 | 0.61 | 55 | 7.4 | 9.1 | 32.7 | 42.0 |
| Admix E | 0.5 | 0.59 | 50 | 10.9 | 11.0 | 32.6 | 43.0 |
| Admix E | 1.0 | 0.55 | 60 | 15.7 | 12.9 | 39.0 | 45.0 |
| Admix E | 1.5 | 0.53 | 50 | 19.6 | 15.6 | 44.4 | 46.8 |
| Admix E | 2.5 | 0.51 | 45 | 22.8 | 15.0 | 44.0 | 53.0 |
| EP 82/27 | 0.1 | 0.59 | 50 | 10.0 | 10.0 | 33.1 | 44.0 |
| EP 82/27 | 0.2 | 0.59 | 55 | 10.9 | 10.2 | 36.3 | 46.0 |
| EP 82/27 | 0.5 | 0.55 | 55 | 15.7 | 11.1 | 39.8 | 49.8 |
| EP 82/27 | 0.8 | 0.53 | 60 | 19.6 | 11.1 | 44.0 | 51.0 |
| EP 82/27 | 1.5 | 0.51 | 55 | 22.8 | 9.2 | 45.0 | 56.8 |

Compared with admixture E, EP 82/27 is shown to perform very efficiently as a water reducing agent, producing similar increases in compressive strength at much lower doses.

Evaluation of Range of Hydroxy Monomers

Abbreviations used:
- AA=Acrylic acid
- MAA=Methacrylic acid
- HPA=Hydroxy propyl acrylate
- HPMA=Hydroxy propyl methacrylate
- HEMA=Hydroxy ethyl methacrylate
- HEA=Hydroxy ethyl acrylate
- TBP=Tri-n-butyl phosphate Copolymers were prepared as 30% w/w active solutions as sodium salts in water (+0.25% TBP).

|   |            |          | Visc (cps) 15% IM aqueous NaCl |
|---|------------|----------|--------------------------------|
| F | 2.5/1 molar | MAA/HPA | 7.4                            |
| G | 2.5/1 molar | AA/HEMA | 5.1                            |
| H | 2.5/1 molar | AA/HPMA | 5.4                            |
| J | 2.5/1 molar | AA/HEA  | 3.4                            |

The copolymers were evaluated in concrete in comparison with EP 82/27 (viscosity 5.1 cps) (2.5/1 molar AA/HPA).

| Mix Design |        |
|------------|--------|
| OPC        | 3.5 kg |
| 20 mm Croxden Gravel | 7.8 kg |
| 10 mm Croxden Gravel | 3.3 kg |
| Zone 3 Almington Pit Sand | 7.0 kg |

Admixtures were dosed at 0.4% bwc in order to produce flowing concrete.

Workability of the concrete was measured using "Flow Table" according to DIN 1048.

Flow A refers to spread before tamping and Flow B to the spread after tamping.

w/c=0.61

TABLE VIII

| Admixture | Slump (mm) | Flow A (cm) | Flow B (cm) | Compressive Strength (N/mm$^2$) 7 day | 28 day |
|-----------|------------|-------------|-------------|--------------------------------------|--------|
| Nil       | 90         | 23          | 40          | 33.2                                 | 44.8   |
| EP 82/27  | —          | 31          | 60          | 34.5                                 | 44.0   |
| F         | —          | 32          | 61          | 32.5                                 | 44.3   |
| G         | —          | 35          | 61          | 34.5                                 | 45.2   |
| H         | —          | 39          | 64          | 32.8                                 | 44.3   |
| J         | —          | 32          | 60          | 33.0                                 | 45.5   |

Using the same mix design, admixtures G and H were re-evaluated in comparison with both EP 82/27 and admixture E in order to determine 1 day compressive strengths and "set" times.

TABLE IX

| admixture | Admixture Dose % bwc | Slump (mm) | Flow A (cm) | Flow B (cm) | Compressive Strength (N/mm$^2$) 1 day |
|-----------|----------------------|------------|-------------|-------------|--------------------------------------|
| Nil       | —                    | 90         | 23          | 40          | 9.5                                  |
| EP 82/27  | 0.4                  | —          | 43          | 63          | 8.1                                  |
| G         | 0.4                  | —          | 43          | 66          | 8.8                                  |
| H         | 0.3                  | —          | 44          | 67          | 8.4                                  |
| H         | 0.4                  | —          | 49          | 68          | 8.2                                  |
| Admix E   | 1.0                  | —          | 48          | 66          | 8.5                                  |

Penetration tests were conducted using a Proctor Needle (according to ASTM No. C-403-80) and the results are summarized below:

TABLE X

| Admixture | Admixture Dose % bwc | Extension of Set over Control (hours) Initial | Final |
|-----------|----------------------|-----------------------------------------------|-------|
| EP 82/27  | 0.4                  | 2.2                                           | 2.2   |
| G         | 0.4                  | 1.4                                           | 1.6   |
| H         | 0.3                  | 1.0                                           | 1.3   |
| H         | 0.4                  | 2.7                                           | 2.5   |
| Admix E   | 1.0                  | 2.7                                           | 2.5   |

The plasticising performance of a range of hydroxy acrylates/methacrylates demonstrates that the AA/HPMA copolymer is preferred.

The use of methacrylic acid instead of acrylic acid in EP 82/27 gives similar results.

In concretes of similar initial high workability set retardation is in the following order (2.5/1 copolymers with AA).

| Admixture E ≧ (retards most) | HPA > | HEMA > | HPMA (retards least) |
|------------------------------|-------|--------|----------------------|

Various copolymers were made to demonstrate the effect of varying the AA/HPMA ratio of the general type of admixture H.

|   |            |                  |         | Visc (cps) 15% solids in 1M aqueous NaCl |
|---|------------|------------------|---------|------------------------------------------|
| K | 2/1 molar  | (67 mole % AA)   | AA/HPMA | 5.3                                      |
| L | 2.5/1 molar| (71 mole % AA)   | AA/HPMA | 5.1                                      |
| M | 3.0/1 molar| (75 mole % AA)   | AA/HPMA | 6.4                                      |
| N | 5.0/1 molar| (83 mole % AA)   | AA/HPMA | 5.2                                      |
| P | 1/0 molar  | (100 mole % AA)  | AA      | 6.6                                      |

Each copolymer was made up into the following additive composition
- 30% Copolymer as Na salt
- 70% Water
- +0.25% TBP

| Mix Design |            |
|------------|------------|
| OPC        | 350 kg/m$^3$ |
| 20 mm Croxden Gravel | 780 kg/m$^3$ |
| 10 mm Croxden Gravel | 330 kg/m$^3$ |
| Zone 3 Almington Pit Sand | 700 kg/m$^3$ |
| Water      | 200 kg/m$^3$ |
| Water/cement = 0.57 | |
| % Fines = 38.7 | |
| Aggregate/cement = 5.2 | |
| Admixture dose = 0.4% bwc. | |

TABLE XI

| Admixture | Slump (mm) | Flow A | Flow B | Compressive Strength (N/mm$^2$) 1 day | 7 day |
|-----------|------------|--------|--------|--------------------------------------|-------|
| Nil       | 60         | 20     | *      | 11.2                                 | 38.0  |
| K         |            | 32     | 56     | 9.5                                  | 37.0  |
| L         |            | 30     | 56     | 9.6                                  | 38.0  |
| M         |            | 28     | 53     | 8.8                                  | 35.5  |

TABLE XI-continued

| Admixture | Slump (mm) | Flow A | Flow B | Compressive Strength (N/mm²) 1 day | 7 day |
|---|---|---|---|---|---|
| N | | 24 | 50 | 8.6 | 38.3 |
| P | | 20 | 44 | 8.0 | 34.7 |

*No cohesion

Results show mole % AA in copolymer significantly affects performance as a plasticiser and to some extent early compressive strength development and support the preferred 60 to 85 mole % acrylic acid content.

Comparisons were made with two other commercially-available plasticisers. They were:

Composition B-a calcium lignosulphonate 43% w/w solution
Composition C=a polysaccharide-based water reducing agent

| Mix Design | |
|---|---|
| OPC ex Blue Circle | 350 kg/m³ |
| 20 mm Croxden Gravel | 780 kg/m³ |
| 10 mm Croxden Gravel | 330 kg/m³ |
| Zone 1 Almington Pit Sand | 70 kg/m³ |
| Zone 2 Almington Pit Sand | 670 kg/m³ |
| Aggregate/cement = 5.3 | |
| % Fines = 40 | |

TABLE XII

| Admixture | Admixture Dose % bwc | W/C | Plastic Density (kg/m³) | Slump (mm) | Compressive Strength (N/mm²) 1 day | 7 day | 28 day |
|---|---|---|---|---|---|---|---|
| Nil | Nil | 0.67 | 2360 | 45 | 3.1 | 31.8 | 40.2 |
| EP 82/27 | 0.05 | 0.67 | 2360 | 85 | 3.1 | 31.7 | 39.3 |
| EP 82/27 | 0.1 | 0.67 | 2360 | 160 | 2.8 | 31.0 | 39.6 |
| EP 82/27 | 0.2 | 0.67 | 2360 | 195 | 3.1 | 31.3 | 40.0 |
| Comp B | 0.2 | 0.67 | 2360 | 140 | 3.1 | 32.4 | 41.2 |
| Comp B | 0.3 | 0.67 | 2360 | 150 | 2.3 | 30.7 | 39.1 |
| Comp B | 0.4 | 0.67 | 2360 | 180 | 2.3 | 31.2 | 41.0 |
| Comp C | 0.2 | 0.67 | 2360 | 175 | 3.3 | 33.1 | 40.5 |
| Comp C | 0.3 | 0.67 | 2360 | 190 | 2.7 | 33.6 | 41.2 |
| Comp C | 0.4 | 0.67 | 2360 | 220 | 1.0 | 33.9 | 43.0 |

At the dosage levels used here EP 82/27 shows no retardation of 1 day compressive strength. Increased dosages of composition B and composition C to obtain higher workability result in retardation of early strength.

7 and 28 day compressive strength results are all similar.

EP 82/27 is shown to perform as a highly effective low dosage plasticizer.

Comparing the dosage levels required to produce concrete with, e.g. 150 mm slump:

| EP 82/27 | 0.09% bwc |
|---|---|
| Composition B | 0.25% bwc |
| Composition C | 0.16% bwc |

We claim:

1. A cementiferous composition comprising as a plasticizer additive, a water-soluble copolymer or soluble salt thereof comprising from 50 to 95 mole % of an ethylenically polymerizable caboxylic acid and from 5 to 50 mole % of a hydroxy alkyl ester of an ethylenically polymerizable carboxylic acid.

2. A cementiferous composition as claimed in claim 1 in which the mole percentage of acid in the copolymer is in the range 60 to 85 mole %; in which the acid is selected from the group consisting of acrylic acid, methacrylic acid, and maleic acid and the ester is selected from the group consisting of hydroxy ethyl, hydroxy propyl, and hydroxy butyl acrylate and methacrylate; and in which the molecular weight of the copolymer is in the range of 1000 to 15,000.

3. A cementiferous composition as claimed in claim 2 in which the acid is acrylic or methacrylic acid and the ester is hydroxy propyl acrylate or methacrylate and in which the molecular weight of the copolymer is in the range 1000 to 9000.

4. A cementiferous composition as claimed in claim 1 in which the amount of hydroxy alkyl ester copolymer is in the range of 0.01–2.5% by weight on the cement in the cementiferous composition.

5. A plasticiser additive composition comprising an aqueous solution of a copolymer, or soluble salt thereof, comprising 50 to 95 mole % of an ethylenically polymerizable carboxylic acid and from 5 to 50 mole % of a hydroxy alkyl ester of an ethylenically polymerizable carboxylic acid and an effective amount of an anti-foaming agent.

6. A plasticiser additive composition as claimed in claim 5, in which the amount of anti-foaming agent is in the range 0.1 to 2% by weight of the copolymer or salt thereof and in which the acid is selected from the group consisting of acrylic acid, methacrylic acid, and maleic acid and the ester is selected from the group consisting of hydroxy ethyl, hydroxy propyl, and hydroxy butyl acrylate and methacrylate.

7. A plasticiser additive composition as claimed in claim 6, in which the anti-foaming agent is selected from the group consisting of tributyl phosphate, dibutyl phthalate, water-insoluble alcohols and silicone derivatives and in which the acid is acrylic or methacrylic acid and the acrylate is hydroxy propyl acrylate or methacrylate.

8. A plasticiser additive composition as claimed in claim 5 in which the ester is hydroxy propyl methacrylate.

9. A plasticiser additive composition as claimed in claim 6 in which the ester is hydroxy propyl methacrylate.

10. A plasticiser additive composition as claimed in claim 7 in which the ester is hydroxy propyl methacrylate.

11. A plasticiser additive composition as claimed in claim 5 in which the mole percentage of acrylic acid in the copolymer is in the range of 60–85 mole %.

12. A plasticiser additive composition as claimed in claim 6 in which the mole percentage of acrylic acid in the copolymer is in the range of 60–85 mole %.

13. A plasticiser additive composition as claimed in claim 7 in which the mole percentage of acrylic acid in the c polymer is in the range of 60–85 mole %.

14. A plasticiser additive composition as claimed in claim 8 in which the mole percentage of acrylic acid in the copolymer is in the range of 60–85 mole %.

15. A plasticiser additive composition as claimed in claim 9 in which the mole percentage of acrylic acid in the copolymer is in the range of 60–85 mole %.

16. A plasticiser additive composition as claimed in claim 10 in which the mole percentage of acrylic acid in the copolymer is in the range of 60–85 mole %.

17. A process for the preparation of a plasticised cementiferous composition comprising adding to a cementiferous material a plasticizer additive as claimed in claim 5.

18. A process for the preparation of a plasticised cementiferous composition comprising adding to a cementiferous material a plasticiser additive as claimed in claim 6.

19. A process for the preparation of a plasticised cementiferous composition comprising adding to a cementiferous material a plasticiser additive as claimed in claim 8.

20. A process for the preparation of a plasticised cementiferous composition comprising adding to a cementiferous material a plasticiser additive as claimed in claim 11.

* * * * *